United States Patent

[11] 3,589,340

| [72] | Inventor | Robert P. Beliles<br>Thiensville, Wis. |
|------|----------|----------------------------------------|
| [21] | Appl. No. | 841,767 |
| [22] | Filed | July 15, 1969 |
| [45] | Patented | June 29, 1971 |
| [73] | Assignee | Colgate-Palmolive Company<br>New York, N.Y. |

[54] ANIMAL FEEDER
3 Claims, 2 Drawing Figs.

| [52] | U.S. Cl. | 119/61 |
|------|----------|--------|
| [51] | Int. Cl. | A01k 5/00 |
| [50] | Field of Search | 119/61, 51, 63, 52 |

[56] References Cited
UNITED STATES PATENTS

| 1,558,316 | 10/1925 | Tipple | 119/51 UX |
| 3,505,977 | 4/1970 | Mancini | 119/61 |

FOREIGN PATENTS

| 423,080 | 1/1935 | Great Britain | 119/61 |

Primary Examiner—Hugh R. Chamblee
Attorneys—T. F. Kryshak and M. L. Youngs

ABSTRACT: The animal feeder comprises a container for granulated or finely divided animal food, a platelike member designed to rest upon the upper surface of the animal food in said container and substantially retain the food in place, said platelike member being provided with at least one aperture adapted to permit at least one animal to take food from said container, and means for preventing said platelike member from being displaced by the animal in such a way as to prevent the animal from obtaining access to the food or to permit the animal to contaminate the food.

PATENTED JUN 29 1971

3,589,340

INVENTOR
ROBERT BELILES
BY
*[signature]*
ATTORNEY 3,589,340

ANIMAL FEEDER

DETAILED DESCRIPTION OF THE INVENTION

In the past there have been a wide variety of devices designed for the automatic feeding of animals. Many of such devices are relatively complex devices, which, when and if they fail prevent the animals from obtaining sufficient food to exist. It has now been discovered that a novel, although relatively simple, device provides the advantages of many of the more complex devices without any possibility of failing in such a way as to prevent the animals from obtaining food.

The present invention will be more fully understood from the description which follows:

Figures 1, 2:
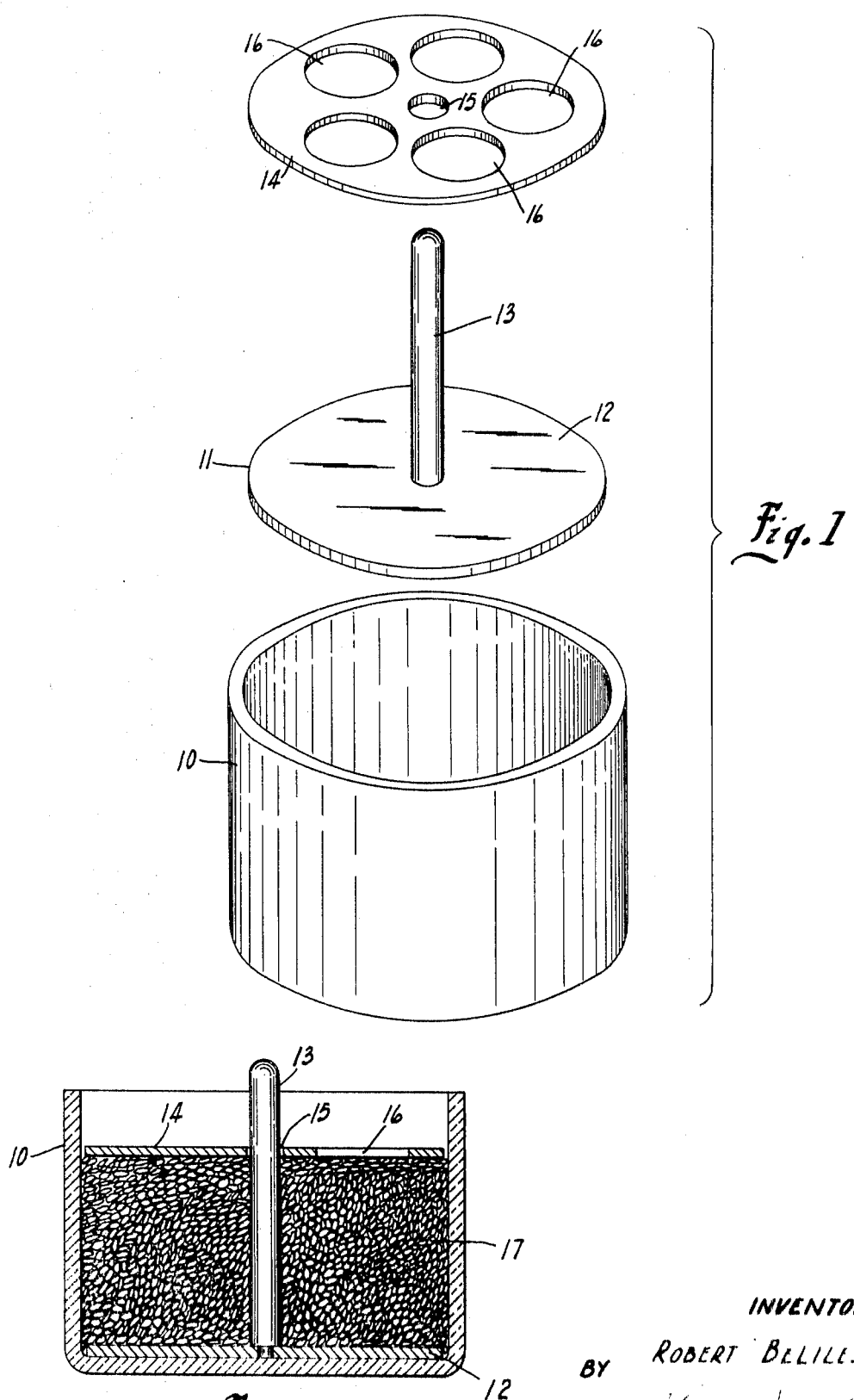
FIG. 1 shows an exploded elevational view of the feeder.
FIG. 2 shows a cross-sectional view of the fully assembled feeder with the animal food in place.

In the preferred embodiment of the invention which is illustrated in the drawings, the animal food container 10 is cylindrical in shape. As seen in FIG. 1 the platelike member 14 is provided with a central aperture 15. In addition, the platelike member 14 is provided with one or more apertures 16 which are sized to allow the animal for which the feeder is intended to be used to eat from, but not unduly disturb the supply of food in the container. The spindlelike member 11 is comprised of a base member 12 which is designed to rest upon the bottom of the container 10 and a vertically extending elongated cylindrical member 13. The diameter of the elongated member 13 is only slightly smaller than the diameter of the central aperture 15 of the platelike member 14 so that the platelike member 14 may be axially positioned about the elongated member 13 by passing said elongated member through the central aperture 15. The central aperture 15 is so sized that the platelike member 14 may rotate perpendicular to the axis of the elongated member 13 in a plane parallel to the base 12, but will not tip or cant therefrom.

When assembled for use as illustrated in FIG. 2 the base member 12 is positioned to rest flat upon the bottom inner surface of the container 10 so that the elongated member 13 projects vertically therefrom. A supply of animal food 17 is positioned in said container over the bottom of the container 10 and the top surface of the base member 12. Sufficient food is present so that at least a portion of the elongated member 13 immediately adjacent to the base 12 is covered with animal food. The platelike member 14 is then positioned upon the surface of the animal food so that at least a portion of the elongated member 13 extends through the central aperture 15 and above the surface of the platelike member 14.

With the various components in the position illustrated in FIG. 2, the animal feeder is ready for use. As the animal or animals eat food from the container through the apertures 16 and the level of the food in the container declines the platelike member 14 descends toward the bottom of the container 10 and the top surface of the base 12 without departing from a substantially horizontal plane. Because the diameter of the elongated member 13 is only slightly smaller than that of the central aperture 15, the platelike member 14 is prevented from canting or tipping. However, the platelike member 14 can still freely rotate about the axis of the elongated member 13 so as to expose additional food to the animals. With the described feeder it is possible for the animal to feed himself and survive, provided he has sufficient water for extended periods of time.

In the preferred embodiment illustrated in the drawing, the elongated member 13 is of sufficient length to extend above the top or mouth of the container 10, thereby providing convenient means for both the platelike member 14 and the spindlelike member 11 to be removed from the container. This enables an animal handler to change the feed of the animals without coming into contact with the animal food which may have become contaminated. In the preferred practice of the invention the entire device, other than the container 10, is made of metal such as stainless steel or a heat stable plastic so that it may be readily sterilized prior to use. The container 10 may be made of glass, metal or plastic.

It will be readily apparent to those skilled in the art that a number of changes and variations may be made without departing from the spirit and scope of the invention.

What I claim is:

1. A small animal feeder comprising a container for granulated animal food, a removable spindlelike member provided with a base which rests upon the inner bottom surface of said container and a centrally located elongated member extending vertically from said base, said elongated member being of sufficient length so that a portion thereof extends above the top of the container, a quantity of granulated animal food positioned in said container and completely covering said base, and a food-retaining platelike member adapted to rest upon the surface of the food, said platelike member being provided with a central aperture and at least one noncentrally located aperture which is sized to provide the animal with access to the food, said platelike member being so positioned in the container that a portion of said elongated member extends through said central aperture, said central aperture being only slightly greater in cross-sectional area than said elongated member so that the two cooperate to prevent the platelike member from being displaced from the surface of said food by an animal and yet allow the platelike member to rotate freely in only a horizontal plane axially about said elongated member, that portion of the elongated member extending above the top of said container being of sufficient length for use as handle means to allow an animal handler to remove both the spindlelike member and the food retaining platelike member from the container without said handler coming in contact with the granulated food which may have been contaminated by the animal.

2. In an animal feeder of the type which comprises a container for animal food, a quantity of granulated animal food in said container and a platelike member positioned upon the upper surface of said food and intended to retain said food in said container, the improvement which comprises: a removable spindlelike member having a base and an elongated vertically projecting member integral to said base, said base being positioned on the upper surface of the bottom inner wall of the container in such a fashion that the elongated member extends vertically upward therefrom, said elongated member being of sufficient length so that a portion thereof extends above the top of said container and said platelike member is provided with a centrally located aperture, which has a cross-sectional diameter only slightly larger than that of the elongated member, and at least one noncentrally located aperture so sized as to permit a feeding animal to obtain access to the food located below said plate, said platelike member being positioned axially about the elongated member so that the elongated member passes through the central aperture and cooperates with the platelike member to prevent it from being displaced from the surface of said food and yet allows the platelike member to rotate freely in only a horizontal plane about said elongated member, said portion of the elongated member which extends above the top of said container serving as handle means so that both the spindlelike member and the food-retaining platelike member may be removed from said container without coming into contact with the granulated food which may have been contaminated by a feeding animal.

3. An animal feeder comprising a container for animal food having an open top and a closed bottom, a platelike member for retaining food in said container, said platelike member being provided with at least one noncentrally located aperture to allow an animal to take food which is positioned below said platelike member from said container, and means for retaining said platelike member in said container, said means for retaining said platelike member in said container and removing it from said container comprising a removable spindlelike member having a base and an elongated vertically projecting member integral to said base, said base being adapted to rest upon the upper surface of the bottom inner wall of said container in such a fashion that the elongated member extends vertically upward therefrom, said platelike member being provided with a central aperture of identical shape and of only slightly greater cross-sectional area than that of said elongated member, said platelike member being so positioned that a portion of the elongated member extends through the central aperture of said platelike member and the two cooperate to prevent the platelike member from being displaced from the surface of the food, said portion of the elongated member extending above the uppermost surface of said platelike member being of sufficient length to provide a means for removing both said platelike member and said spindlelike member from said container without coming into contact with the food in said container which ma have been contaminated.